(12) United States Patent
Dlagnekov

(10) Patent No.: US 11,292,403 B2
(45) Date of Patent: *Apr. 5, 2022

(54) SYSTEMS AND METHODS FOR IMPACT DETECTION WITH NOISE ATTENUATION OF A SENSOR SIGNAL

(71) Applicant: CalAmp Corp., Irvine, CA (US)

(72) Inventor: Alexandre Dlagnekov, Escondido, CA (US)

(73) Assignee: CalAmp Corp., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/883,654

(22) Filed: May 26, 2020

(65) Prior Publication Data

US 2020/0391679 A1     Dec. 17, 2020

Related U.S. Application Data

(63) Continuation of application No. 16/284,840, filed on Feb. 25, 2019, now abandoned, which is a continuation of application No. 14/737,197, filed on Jun. 11, 2015, now Pat. No. 10,214,166.

(51) Int. Cl.
| | |
|---|---|
| *B60R 16/023* | (2006.01) |
| *G01P 15/00* | (2006.01) |
| *G07C 5/00* | (2006.01) |
| *B60R 21/0132* | (2006.01) |
| *G01P 15/08* | (2006.01) |
| *G07C 5/08* | (2006.01) |

(52) U.S. Cl.
CPC ...... *B60R 16/0232* (2013.01); *B60R 21/0132* (2013.01); *G01P 15/00* (2013.01); *G01P 15/0891* (2013.01); *G07C 5/008* (2013.01); *G07C 5/085* (2013.01)

(58) Field of Classification Search
CPC .. G01P 15/0891; G01P 15/00; B60R 16/0232; B60R 21/0132; G07C 5/008; G07C 5/085
USPC ............................................................ 702/141
See application file for complete search history.

(56) References Cited

U.S. PATENT DOCUMENTS

| | | | | |
|---|---|---|---|---|
| 5,767,766 | A * | 6/1998 | Kwun | B60R 21/0136 180/282 |
| 5,874,675 | A * | 2/1999 | Edmans | G01P 15/124 73/514.21 |
| 6,912,557 | B1 * | 6/2005 | North | G06F 7/483 708/490 |
| 10,214,166 | B2 * | 2/2019 | Dlagnekov | G01P 15/0891 |

(Continued)

*Primary Examiner* — John H Le
(74) *Attorney, Agent, or Firm* — Barnes & Thornburg LLP

(57) ABSTRACT

Systems and methods for impact detection in accordance with embodiments of the invention are disclosed. In one embodiment, a vehicle impact detection system includes an acceleration sensor, a storage device storing an impact detection application, and a processor, where the impact detection application directs the processor to receive acceleration information using the acceleration sensor, filter the acceleration information to attenuate noise, determine an occurrence of an impact by detecting an acceleration from the acceleration information that exceeds a threshold for a time period, detect an angle of the impact with respect to a forward direction using the acceleration information, and trigger an impact detector signal.

20 Claims, 7 Drawing Sheets

(56) References Cited

U.S. PATENT DOCUMENTS

2010/0042286 A1* 2/2010 Lich .................. B60R 21/0132
                                                           701/32.2
2014/0300739 A1* 10/2014 Mimar ................. G08B 21/06
                                                           348/148

* cited by examiner

SYSTEMS AND METHODS FOR IMPACT DETECTION WITH NOISE ATTENUATION OF A SENSOR SIGNAL

CROSS REFERENCE TO RELATED APPLICATIONS

The current application is a continuation of U.S. patent application Ser. No. 16/284,840, entitled "Systems and Methods for Impact Detection with Noise Attenuation of a Sensor Signal" to Alexandre Dlagnekov, filed Feb. 25, 2019, which is a continuation of U.S. patent application Ser. No. 14/737,197, entitled "Systems and Methods for Impact Detection with Noise Attenuation of a Sensor Signal" to Alexandre Dlagnekov, filed Jun. 11, 2015 and issued on Feb. 26, 2019 as U.S. Pat. No. 10,214,166, the disclosures of which are expressly incorporated by reference herein in their entirety.

FIELD OF INVENTION

The present invention relates to impact detection enhancements for a vehicle impact detection system and more particularly to determining an angle of an impact relative to the vehicle.

BACKGROUND

A Global Positioning System (GPS) is a space based global navigation satellite system that utilizes a network of geo-synchronous satellites which can be utilized by a GPS receiver to determine its location. Many telematics systems incorporate a Global Positioning System (GPS) receiver, which can be used to obtain the location of a vehicle at a certain measured time. By comparing the location of a vehicle at a plurality of measured times, the speed of the vehicle can be determined. GPS receivers can also determine speed by measuring the Doppler shift in the received satellite signals. The acceleration of the vehicle can be determined as the change in speed divided by the time between the measurements. A GPS receiver's ability to determine acceleration can be limited due to the dependence of the measurement upon factors such as reception and satellite availability. In addition to location information, a GPS receiver can also be configured to provide time data.

An accelerometer is a device that measures acceleration associated with the weight experienced by a test mass in the frame of reference of the accelerometer device. The acceleration measured by an accelerometer is typically a weight per unit of test mass, or g-force.

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for impact detection in accordance with embodiments of the invention are disclosed. In one embodiment, a vehicle impact detection system includes an acceleration sensor, a storage device storing an impact detection application, and a processor, where the impact detection application directs the processor to receive acceleration information using the acceleration sensor, filter the acceleration information to attenuate noise, determine an occurrence of an impact by detecting an acceleration from the acceleration information that exceeds a threshold for a time period, detect an angle of the impact with respect to a forward direction using the acceleration information, and trigger an impact detector signal.

In another embodiment of the invention, the threshold value is pre-determined.

In an additional embodiment of the invention, filtering the acceleration information includes using a series of accumulators positioned in a circular queue.

In yet another additional embodiment of the invention, each accumulator holds up to 32 samples.

In still another additional embodiment of the invention, detecting the angle of the impact includes computing a first vector perpendicular to the forward direction, and computing an angle between the first vector and a vector corresponding to a direction of the acceleration.

In yet still another additional embodiment of the invention, the acceleration sensor is a micro-electro-mechanical system (MEMS).

In yet another embodiment of the invention, filtering the acceleration information includes using a configurable moving average filter to attenuate acoustic noise.

In still another embodiment of the invention, the acceleration information is a signal that includes a leading edge, a trailing edge, and an amplitude.

In yet still another embodiment of the invention, the impact detection application further directs the processor to generate impact data based on the detected angle of the impact and the impact detector signal.

Still another embodiment of the invention includes a method for determining an angle of impact of a vehicle, that includes receiving acceleration information using a vehicle impact detection system, filtering the acceleration information to attenuate noise using the vehicle impact detection system, determining an occurrence of an impact by detecting an acceleration from the acceleration information that exceeds a threshold for a time period using the vehicle impact detection system, detecting the angle of the impact with respect to a forward direction using the acceleration information, and triggering an impact detector signal using the vehicle impact detection system.

In another embodiment of the invention, the threshold value is pre-determined.

In an additional embodiment of the invention, filtering the acceleration information includes using a series of accumulators positioned in a circular queue.

In still another additional embodiment of the invention, each accumulator holds up to 32 samples.

In yet still another additional embodiment of the invention, detecting the angle of the impact includes computing a first vector perpendicular to the forward direction using the vehicle impact detection system and computing an angle between the first vector and a vector corresponding to a direction of the acceleration using the vehicle impact detection system.

In yet another embodiment of the invention, using the vehicle impact detection system includes an acceleration sensor, a processor, and a memory.

In still another embodiment of the invention, filtering the acceleration information includes using a configurable moving average filter to attenuate acoustic noise using the vehicle impact detection system.

In yet still another embodiment of the invention, acceleration information is a signal comprising a leading edge, a trailing edge, and an amplitude.

In a further embodiment of the invention still, the method further includes generating impact data based on the detected angle of the impact and the impact detector signal using the vehicle impact detection system.

In a still further embodiment of the invention still, the method further includes transmitting the impact data to a remote server system using the vehicle impact detection system.

DETAILED DESCRIPTION

Figure 1:
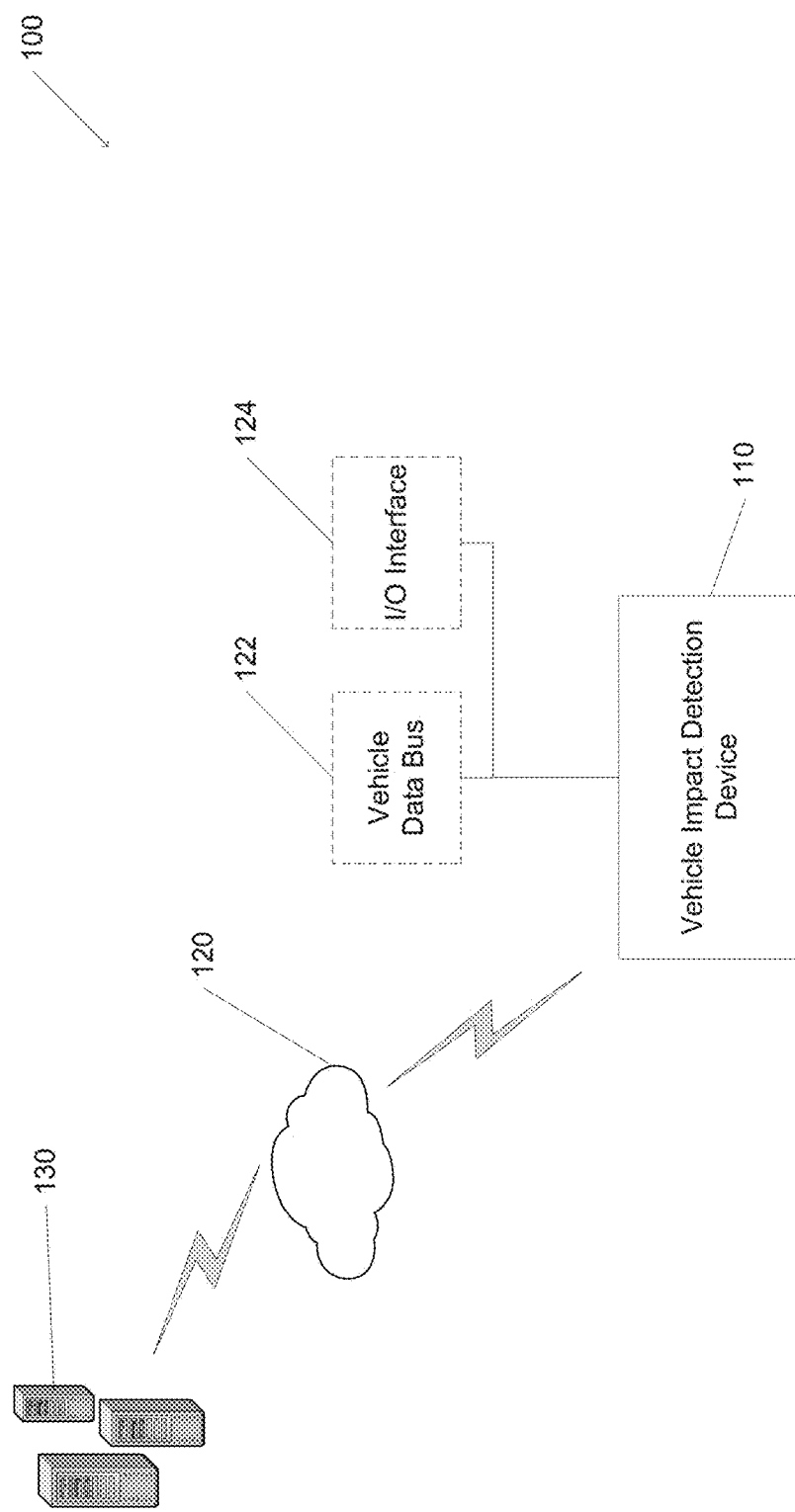
FIG. 1 conceptually illustrates a vehicle impact detection system in accordance with an embodiment of the invention.

Turning now to the drawings, systems and methods for impact detection in accordance with embodiments of the invention are illustrated. In particular, acceleration data gathered from one or more sensor(s) can be used to detect an occurrence of an impact to a vehicle, which can provide insights into driver behavior. For example, such data can indicate a variety of driver behaviors, including, but not limited to, occurrence of accidents and collisions with obstacles. Furthermore, impact detection systems can be positioned within mobile containers, such as cargo, to detect the occurrence of impacts to the containers and thus identify the source of damaged goods during transport. Although the discussion below primarily discusses impact detection systems used within a vehicle (such as an automobile, commercial vehicle, tractor, forklift, among various other types of vehicles), impact detection systems can be utilized within any of a variety of different types of devices (e.g., cargo containers, goods, among various other types of items) that require the detection of impacts as appropriate to the requirements of specific application.

An impact detection system can use include one or more sensors capable of gathering information that can be used to identify the occurrence of an impact as appropriate to the requirements of specific applications of embodiments of the invention. For example, the sensors can include an accelerometer that is able to detect an acceleration of the vehicle in a particular direction. Accelerometers are often installed on a vehicle or mobile device. Accurate accelerometer data aligned with the axes of the vehicle is beneficial in many applications, including, but not limited to, telematics. Telematics is the integrated use of telecommunications and informatics, including, but not limited to, monitoring vehicle movement and behavior. Systems and methods for aligning a 3-axis accelerometer to a vehicle in accordance with embodiments of the invention are disclosed in U.S. Patent Publication No. 2013/0073142, titled "Systems and Methods for 3-Axis Accelerometer Calibration" and filed Sep. 19, 2012, the entirety of which is hereby incorporated by reference. Systems and methods for efficient characterization of acceleration events are disclosed in U.S. Patent Publication No. 2014/0142886, titled "Systems and Methods for Efficient Characterization of Acceleration Events" and filed Nov. 21, 2012, the entirety of which is hereby incorporated by reference.

In many embodiments, a vehicle impact detection system can be able to detect the occurrence of an impact to the vehicle, including the force and direction of the impact relative to a moving direction of the vehicle. In particular, the vehicle impact detection system can trigger a signal when it detects an acceleration (e.g., caused by an impact) that exceeds a predefined threshold for a time period. In some embodiments, the acceleration can be measured using a micro-electro-mechanical system (MEMS) that can consist of a central unit that processes data (i.e., the microprocessor) and several components that interact with the surroundings, including interacting with various sensors of the vehicle impact detection device. Certain MEMS systems can be prone to acoustic noise generated by the operation of the vehicle and can lead to inconsistency in impact detection and in particular, the ability to identify accelerations that are the result of an impact versus those accelerations resulting from vibrations and/or the operation of the vehicle. The noise includes, but is not limited to, noise from the device itself and vibrations from the vehicle in which the device is mounted. For example, many heavy machinery vehicles such as forklifts can have large engines and motors that produce a lot of vibration and noise. Thus, differentiating between an impact to the vehicle and a vibration can require an analysis of the input signal that is able to attenuate the noise within the signal that is a result of the vibrations.

Accordingly, many embodiments of the vehicle impact detection system can include a filter that attenuates acoustic noise from an input signal and thus provides better consistency of the threshold detection. In some embodiments, the filter is a configurable moving average filter implemented as four accumulators in a circular queue. In certain embodiments, the required memory for implementing the filter can be reduced to 128 samples by using four accumulators. In several embodiments, each accumulator holds up to 32 samples. In many embodiments, the acceleration information is a signal including a leading edge, a trailing edge, and an amplitude that are utilized to characterize the acceleration information.

Furthermore, many embodiments of the vehicle impact detection system can determine an angle of an impact relative to a moving direction of the vehicle. In certain embodiments, in order to increase an accuracy for determining a particular direction of an impact, these embodiments compute an angle between a detected acceleration vector and a vector that is perpendicular to a forward direction of the vehicle. Examples of vehicle impact detection systems that include filters to attenuate noise in accordance with embodiments of the invention are described below.

Vehicle Impact Detection Systems

Vehicle impact detection systems can obtain a variety data that can be used to determine the occurrence of an impact to the vehicle. A conceptual diagram of a vehicle impact detection system in accordance with an embodiment of the invention is shown in FIG. 1. The vehicle impact detection system 100 includes a vehicle impact detection device 110 that can be capable of communicating with a remote server system 130, a vehicle data bus 122, and/or an input/output (I/O) interface 124 as appropriate to the requirements of specific applications of embodiments of the invention. In a variety of embodiments, the vehicle impact detection device 110 communicates with the remote server system 130 via a network 120. In a variety of embodiments, the network 120 is the Internet. In many embodiments, the network 120 is any wired or wireless connection, such as a cellular network connection, between the vehicle impact detection device 110 and the remote server system 130. In a number of embodiments, the remote server system 130 implemented using a single server system. In several embodiments, the remote server system 130 is implemented using multiple server systems.

In a variety of embodiments, the vehicle impact detection device 110 is installed in a vehicle having a vehicle data bus 122. The vehicle impact detection device 110 can obtain data from any of a variety of vehicle devices connected to the vehicle data bus 122 utilizing any of a variety of techniques as appropriate to the requirements of specific applications of embodiments of the invention. Vehicle devices can include, but are not limited to, engine sensors, electronic control unit (ECU) devices, alternator sensors, vibration sensors, voltage sensors, oxygen sensors, Global Positioning System (GPS) receivers, ignition devices, accelerometers, and/or other sensors capable of providing acceleration information. Systems and methods for connecting to a vehicle data bus that can be utilized in accordance with embodiments of the invention are described in SAE J1978, titled "OBD II Scan Tool", first published by SAE International of Troy, Mich. on Mar. 1, 1992 and last updated Apr. 30, 2002. Systems and methods for obtaining data from devices connected to a vehicle data bus are described in SAE J1979, titled "E/E Diagnostic Test Modes", first published by SAE International on Dec. 1, 1991 and last updated Aug. 11, 2014. The disclosures of SAE J1978 and SAE J1979 are hereby incorporated by reference in their entirety.

The vehicle impact detection device 110 can include any of a variety of sensors and/or devices, including those described above with respect to the vehicle data bus and those described in more detail below, to obtain data regarding the occurrence of an impact to the vehicle and/or an angle of the impact with respect to a direction of the vehicle. This data can also be utilized in a variety of vehicle impact detection processes to determine the status of the vehicle and the occurrence of impact(s) to the vehicle as described in more detail below. The vehicle impact detection device 110 can also communicate with any of a variety of sensors and/or devices using the I/O interface 124 as appropriate to the requirements of specific applications of embodiments of the invention. The I/O interface 124 can be any connection, including wired and wireless connections, as appropriate to the requirements of specific applications of embodiments of the invention.

In many embodiments, the vehicle impact detection device utilizes an accelerometer in order to determine the location, speed, and/or acceleration of the vehicle. In certain embodiments, the vehicle impact detection device utilized a Global Positioning System (GPS) receiver and/or accelerometer to determine the location, speed, and/or acceleration of the vehicle. However, it should be noted that any location-determining techniques, such as cellular tower triangulation, wireless network geolocation techniques, and dead reckoning techniques, can be utilized as appropriate to the requirements of specific applications of embodiments of the invention.

In a variety of embodiments, the vehicle impact detection device 110 and/or remote server system 130 provides a user interface allowing for visualizing and interacting with the data. In several embodiments, the vehicle impact detection device 110 and/or remote server system 130 provides an interface, such as an application programming interface (API) or web service that provides some or all of the data to third-party systems for further processing. Access to the interface can be open and/or secured using any of a variety of techniques, such as by using client authorization keys, as appropriate to the requirements of specific applications of the invention.

Although a specific architecture of a vehicle impact detection system in accordance with embodiments of the invention are discussed above and illustrated in FIG. 1, a variety of architectures, including sensors and other devices and techniques not specifically named, can be utilized in accordance with embodiments of the invention. Furthermore, the processes described herein can be performed using any combination the vehicle impact detection device and/or the remote server systems as appropriate to the requirements of specific applications of embodiments of the invention.

Vehicle Impact Detection Devices

Figure 2:
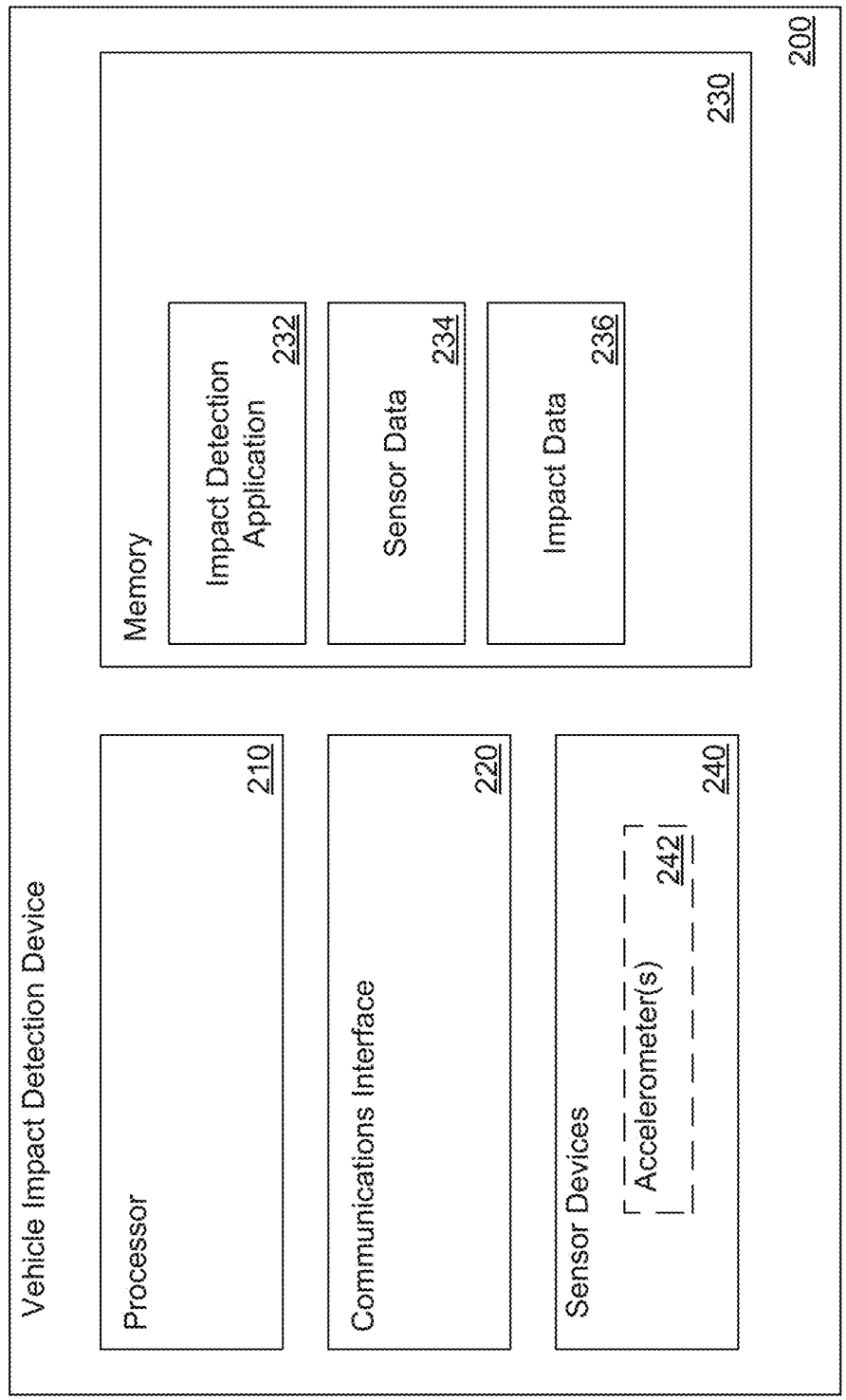
FIG. 2 conceptually illustrates a vehicle impact detection device in accordance with an embodiment of the invention.

Vehicle impact detection devices in accordance with embodiments of the invention can obtain data regarding the status of a vehicle, including occurrences of impacts to the vehicle. A conceptual illustration of a vehicle impact detection device in accordance with an embodiment of the invention is shown in FIG. 2. The vehicle impact detection device 200 includes a processor 210 in communication with memory 230. The vehicle impact detection device 200 also includes one or more communication interfaces 220 capable of sending and receiving data. In a number of embodiments, the communication interface 220 is in communication with the processor 210, the memory 230, and/or the sensor device(s) 240, which can include one or more accelerometer(s) 242 as appropriate to the requirements of specific applications of embodiments of the invention. In several embodiments, the memory 230 is any form of storage configured to store a variety of data, including, but not limited to, an impact detection application 232, sensor data 234, and/or impact data 236. In many embodiments, impact detection application 232, sensor data 234, and/or impact data 236 is stored using an external server system and received by the vehicle impact detection device 200 using the communications interface 220.

The processor 210 is configured by the impact detection application 232 to perform a variety of vehicle impact detection processes. Vehicle impact detection processes can include obtaining sensor data 234 from a variety of sensor devices and/or accelerometer(s) 242 to determine an occurrence of an impact to the vehicle and/or an angle of the impact. Impact data 236 describing the occurrence of an impact can be generated. Sensor devices 240 can include RPM sensors, voltage sensors, GPS receivers, noise sensors, vibration sensors, acceleration sensors 242, and any other device capable of measuring data regarding a vehicle, including an occurrence of impacts to the vehicle, as appropriate to the requirements of specific applications of embodiments of the invention. Sensor devices 240 can be included within the vehicle impact detection device 200 and/or located external to the vehicle impact detection device 200. The vehicle impact detection device 200 can communicate with external sensor devices using the communications interface 220, such as via a vehicle data bus, I/O interface, and/or a network connection as appropriate to the requirements of specific applications of embodiments of the invention. In many embodiments, the sensor data 234 and/or impact data 236 is transmitted to a remote server system using the communications interface 220. A number of vehicle impact detection processes that can be performed in order to detect an occurrence of an impact in accordance with embodiments of the invention are described in more detail below.

Although a specific architecture for a vehicle impact detection device in accordance with an embodiment of the invention is conceptually illustrated in FIG. 2, any of a variety of architectures, including those that store data or applications on disk or some other form of storage and are loaded into memory at runtime, can also be utilized. In a variety of embodiments, the memory 230 includes circuitry such as, but not limited to, memory cells constructed using transistors, that are configured to store instructions. Similarly, the processor 210 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Impact Detection

Figure 3:
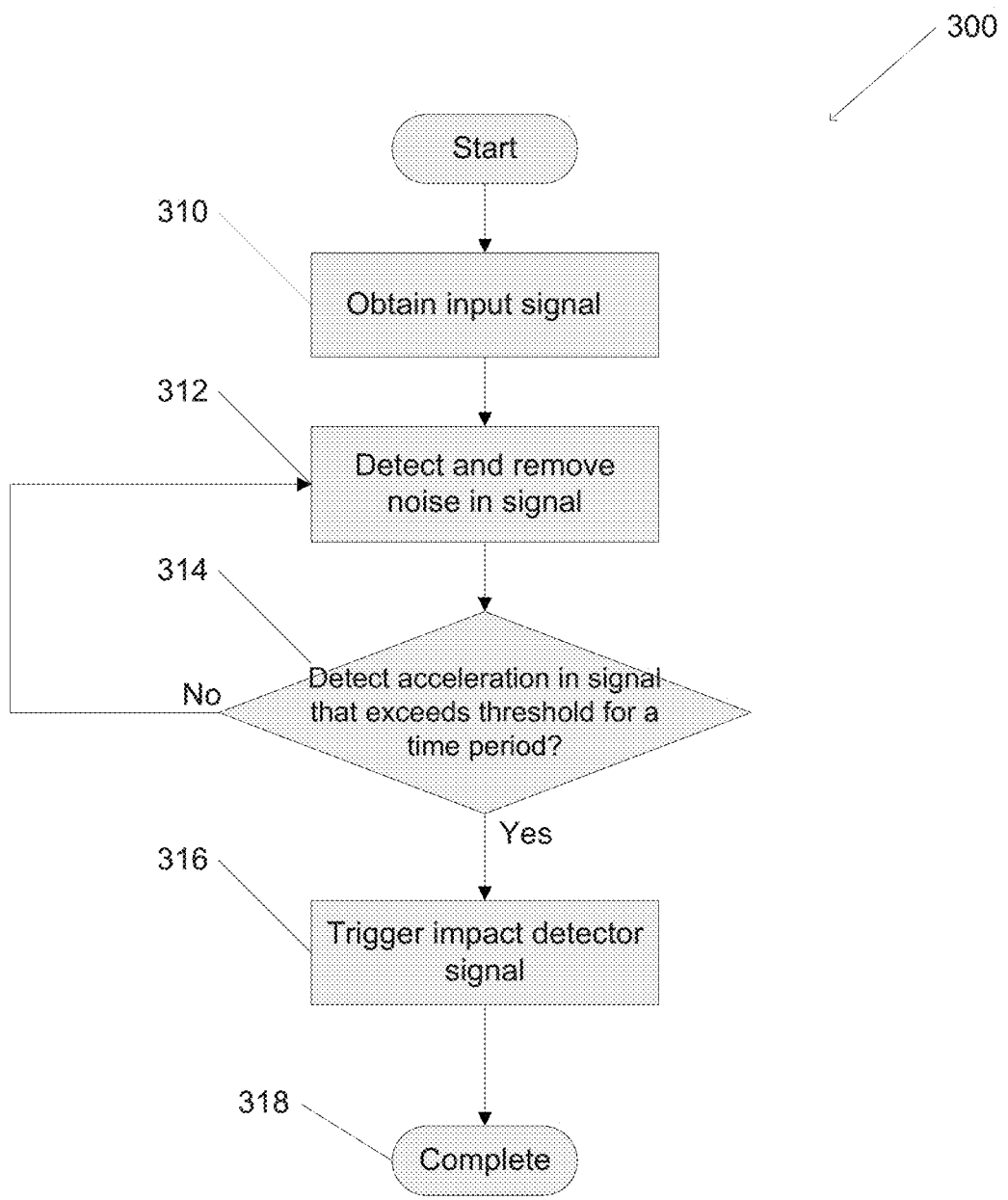
FIG. 3 is a flow chart illustrating a process for filtering noise from an input signal of a sensor device in order to detect the occurrence of an impact in accordance with an embodiment of the invention.

In many embodiments, a vehicle impact detection device can include an impact detector that is able to attenuate acoustic noise from an input signal and thus provides better consistency of the impact detection based on acceleration information. In some embodiments, the vehicle impact detection device includes a configurable moving average filter implemented as four accumulators in a circular queue which can be used to filter out the noise. In certain embodiments, the required memory for implementing the filter can be reduced to 128 samples by using four accumulators with each accumulator holding up to 32 samples. An example of a process for filtering noise from an input signal of a sensor device in order to detect the occurrence of an impact in accordance with an embodiment of the invention is illustrated in FIG. 3.

The process 300 obtains (at 310) an input signal. The input signal can be a signal received from one or more sensor devices of the vehicle impact detection device. In some embodiments, the signal is provided by one or more impact detectors positioned throughout the vehicle. In some embodiments, the impact detector can be any one of or combination of an accelerometer, gyroscope, GPD device, or any other device that can be used to detect an acceleration of the vehicle in a particular direction.

The process detects and removes (at 312) noise from the input signal. In some embodiments, the process uses a filter to detect and remove the noise from the filter. In some embodiments, the filter computes a moving average of the signal and removes this from the signal. An example of a process for removing noise using a moving average filter is described in detail below with respect to FIG. 4. Other embodiments can compute different values to detect the noise in the signal, including the mode, median, or any other value as appropriate to the requirements of specific applications in accordance with embodiments of the invention.

The process determines (at 314) whether it detects an acceleration in the signal that exceeds a threshold for a time period. The threshold can be determined based on the type of vehicle, the location of the acceleration on the vehicle, among various other factors.

If the process detects the acceleration in the signal that exceeds the threshold for the time period, the process triggers (316) the impact detector signal. Otherwise, the process returns to 310 to obtain newer input signals. In some embodiments, the impact detector signal can be used to initiate various safety devices of the vehicle, including, for example, airbags, seatbelts, brakes, steering, among various others. The process then completes.

Figure 4:
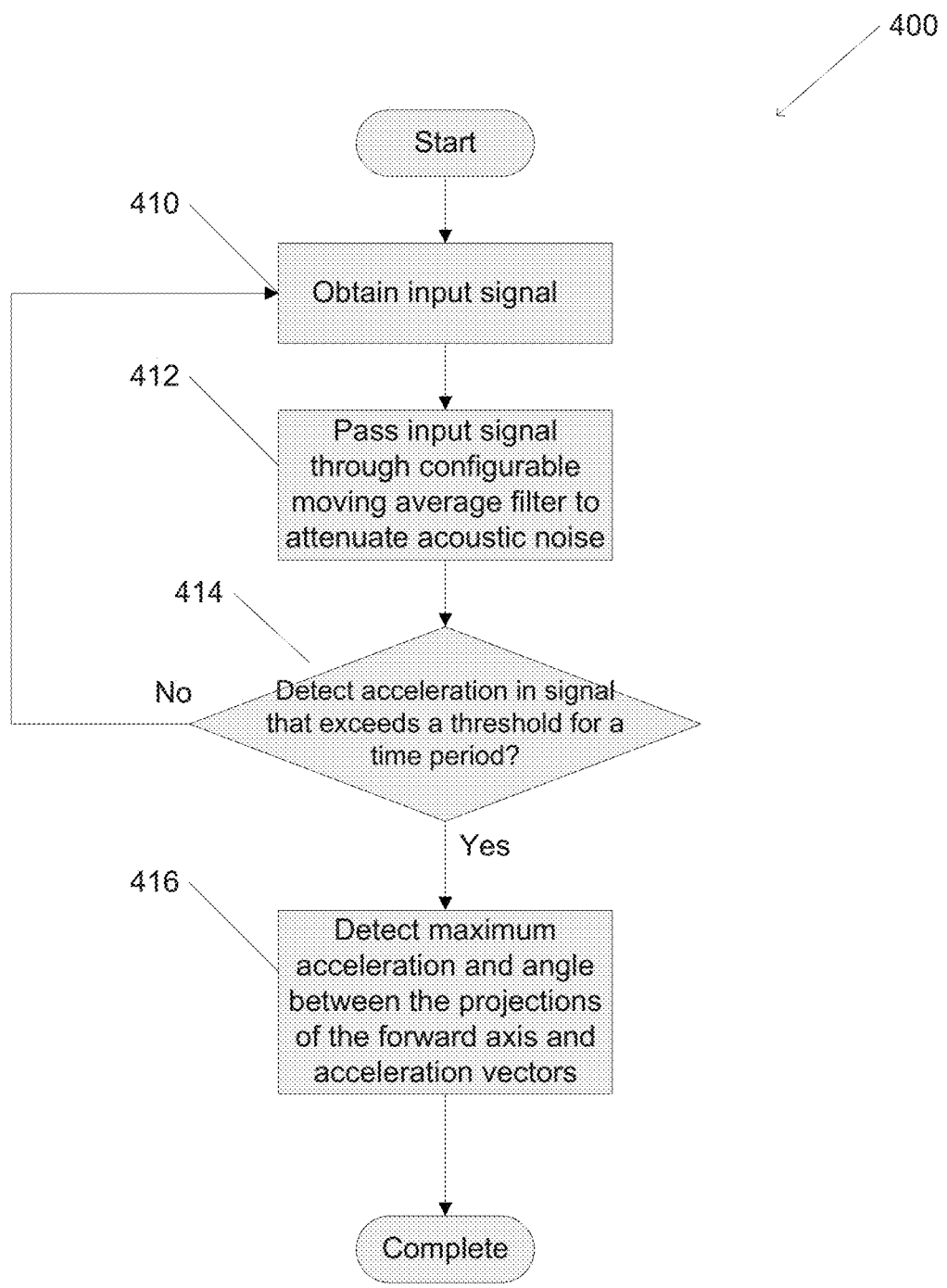
FIG. 4 is a flow chart illustrating a process for removing noise from a signal using a configurable moving average filter and determining an angle of the impact in accordance with an embodiment of the invention.

As described above, different filters can be used to attenuate the noise from an input signal. Many embodiments can implement a circular queue of accumulators that are used to compute a moving average of the input signal to determine and remove the noise from the signal. Furthermore, many embodiments can use one or more accumulators that are able to record both the acceleration and angle of the impact. An example of a process for removing noise from a signal using a configurable moving average filter and determining an angle of the impact in accordance with an embodiment of the invention is illustrated in FIG. 4.

The process obtains (at 410) an input signal passes (at 412) the input signal through a configurable moving average filter to attenuate the acoustic noise. In some embodiments, the configurable moving average filter can be implemented as a series of four accumulators in a circular queue, each sampling 32 samples of the input signal for a total of 128 samples.

The process determines (at 414) whether it detects an acceleration in the signal that exceeds a threshold for a time period. If the process does not detect an acceleration that exceeds a threshold for a time period, the process returns to 410 to obtain an input signal.

Figure 5:
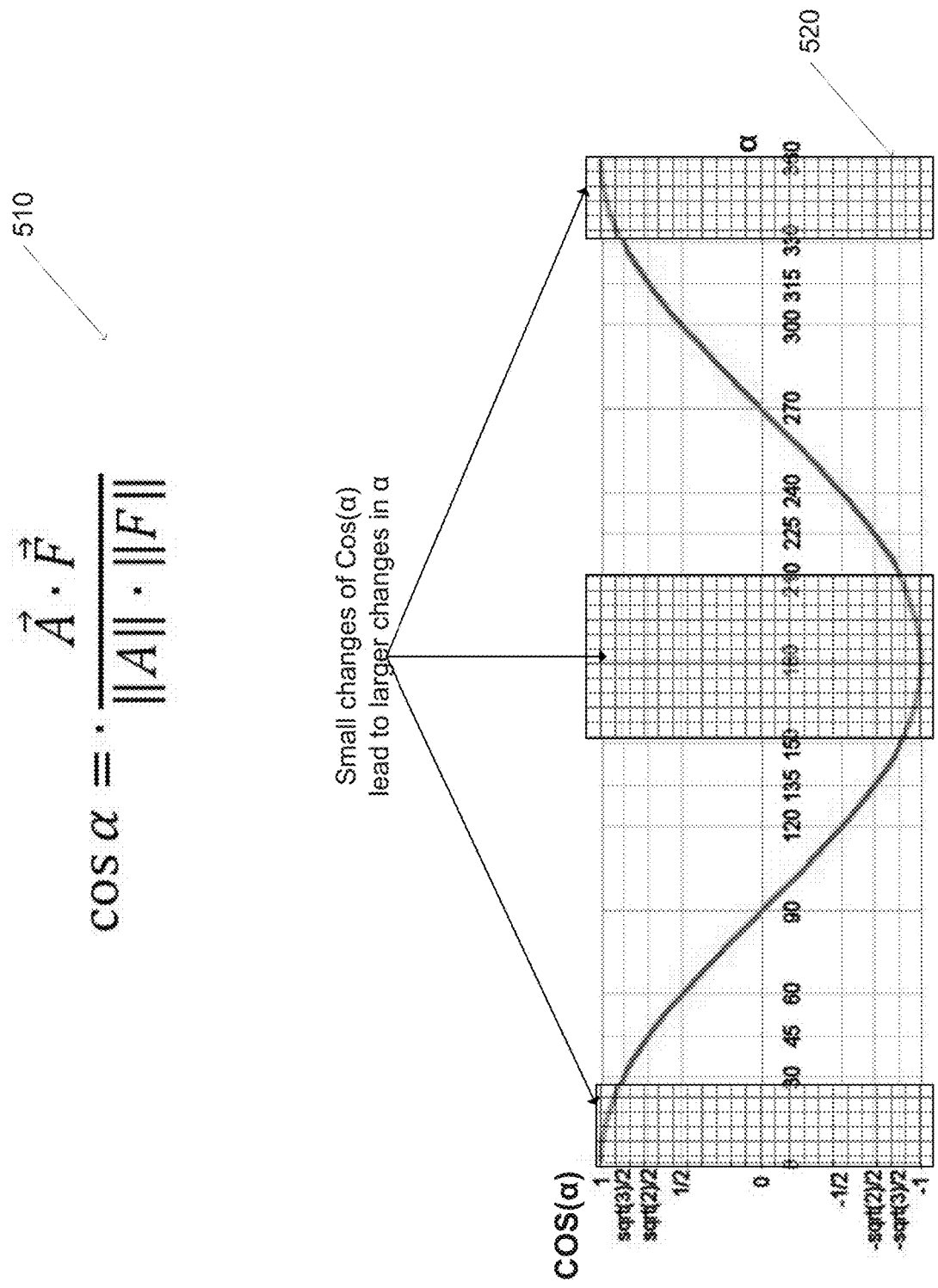
FIG. 5 illustrates an equation for computing an angle between two vectors in accordance with an embodiment of the invention.

If the process does detect an acceleration that exceeds the threshold for the time period, the process determines the maximum acceleration and angle between the projections of the forward axis and acceleration vectors. FIG. 5 illustrates an equation 510 for computing an angle between two vectors. The process then completes.

As described above, the vehicle impact detection device can detect an impact as well as the direction of the impact relative to a moving direction of the vehicle. In some embodiments, the direction of the impact can be computed using equation 510 illustrated in FIG. 5.

In particular, equation (1) below provides that:

$$\cos\alpha = \cdot \frac{\vec{A}\cdot\vec{F}}{\|A\|\cdot\|F\|} \tag{1}$$

where α is the angle between the acceleration vector $\vec{A}$ and the vector of the forward axis $\vec{F}$ in the horizontal plane.

Graph 520 illustrates the α (x-axis) angle value relative to the cos α value (y-axis). As illustrated by graph 520, for certain portions of the graph, illustrated by the checkered squares overlaid on the graph, small changes in the cos α value can lead to larger changes in the α values, in particular around values near 0 degrees and 180 degrees. Thus certain impacts to the vehicle that can be head-on (near 0 degrees) or rear-end (near 180 degrees) type impacts can result in less precision regarding being able to ascertain the exact angle of impact given the smaller changes in the cos α value that is computed for the vectors will result in larger changes in the computed α values.

Figure 6:
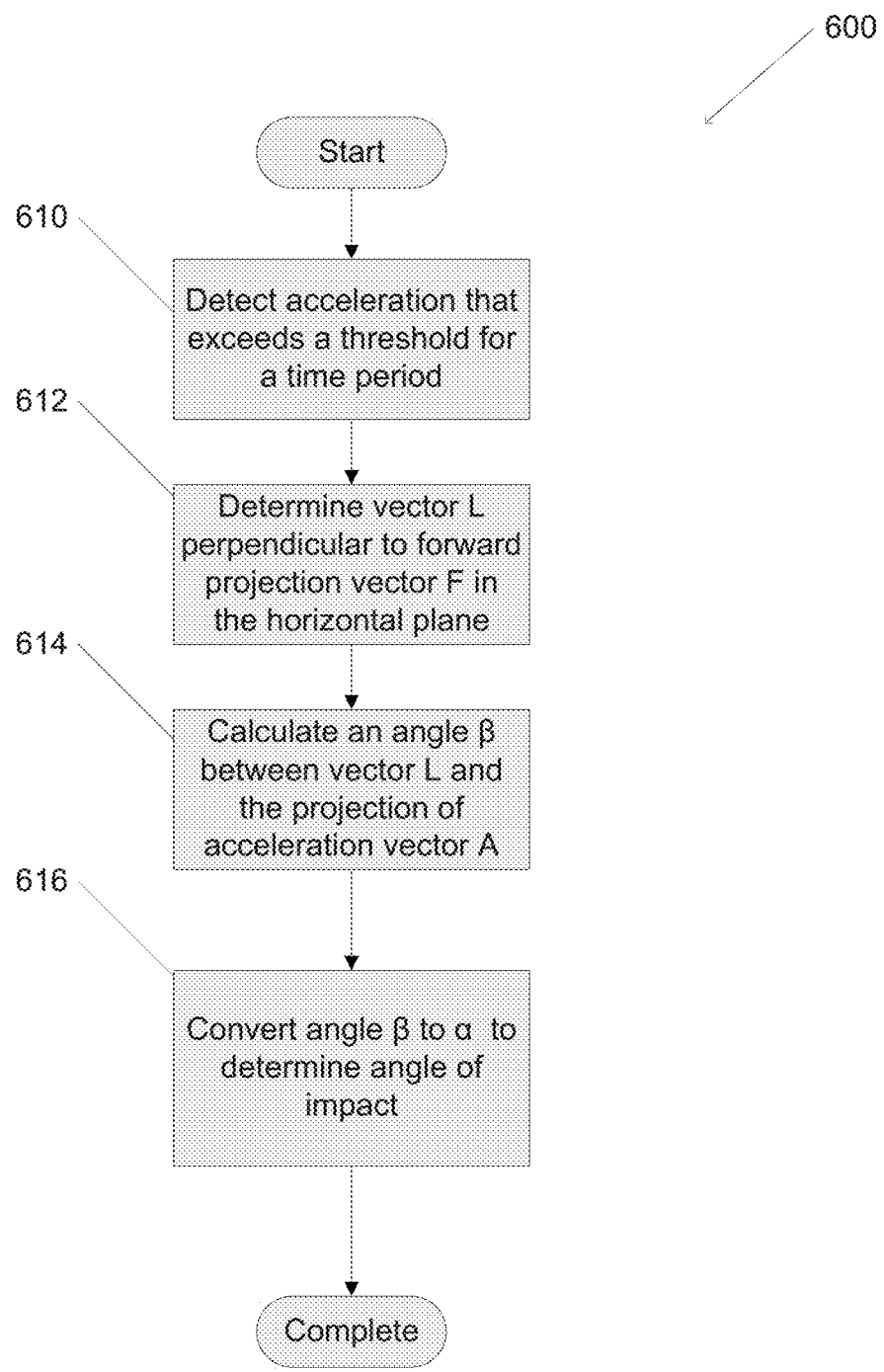
FIG. 6 is a flow chart illustrating a process for computing an angle of impact in accordance with an embodiment of the invention.
Figure 7:
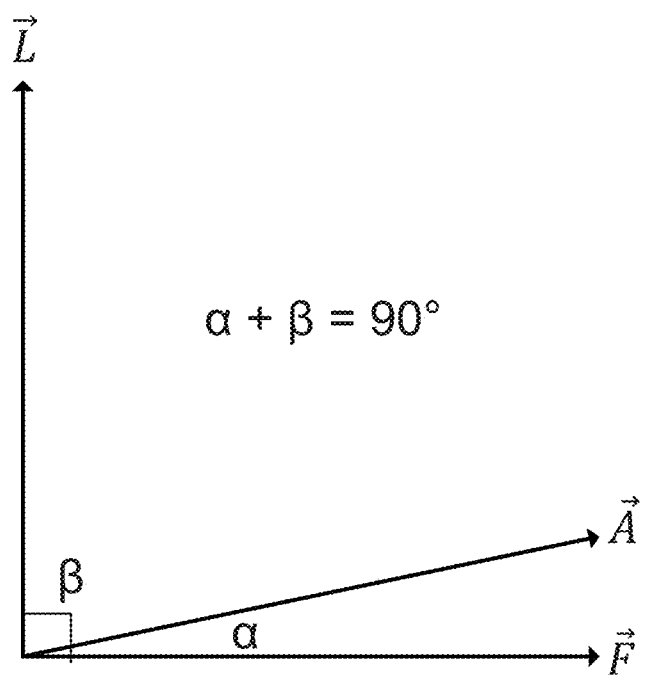
FIG. 7 conceptually illustrates a vector perpendicular to the forward projection in the horizontal plane and the projection of the acceleration in accordance with an embodiment of the invention.

In order to improve precision for calculating angles close to 0 degrees and 180 degrees, some embodiments recalculate the α angle using a vector perpendicular to the forward projection in the horizontal plane and the projection of the acceleration. An example of a process for computing an angle of impact in accordance with an embodiment of the invention is illustrated in FIG. 6. Furthermore, FIG. 7 illustrates the relationship between the various vectors, including a vector $\vec{L}$ that is perpendicular (or at a 90 degree angle) with respect to the forward projection vector $\vec{F}$ in the horizontal plane.

The process 600 detects (at 610) an acceleration that exceeds a threshold for a time period. The process determines (at 612) a vector $\vec{L}$ that is perpendicular to the forward projection vector $\vec{F}$ in the horizontal plane. The process calculates (at 614) an angle β between vector $\vec{L}$ and the projection of acceleration vector $\vec{A}$ using equation (1) above. The process can convert (at 616) angle β to angle α using equation (2), below:

$$\alpha + \beta = 90° \quad (2)$$

Although specific processes are described above with respect to FIG. 6 with respect to determine an angle of an impact using a vector perpendicular to the forward projection of the vehicle, any of a variety of processes can be utilized to determine an angle of impact as appropriate to the requirements of specific applications in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A vehicle impact detection system, comprising:
   an acceleration sensor;
   a storage device storing an impact detection application; and
   a processor;
   wherein the impact detection application directs the processor to:
      receive acceleration information using the acceleration sensor;
      filter the acceleration information to attenuate noise;
      determine an occurrence of an impact by detecting an acceleration from the acceleration information that exceeds a threshold for a time period;
      detect an angle of the impact with respect to a forward direction using the acceleration information; and
      trigger an impact detector signal.

2. The vehicle impact detection system of claim 1, wherein the threshold value is pre-determined.

3. The vehicle impact detection system of claim 1, wherein to filter the acceleration information comprises to use a series of accumulators positioned in a circular queue.

4. The vehicle impact detection system of claim 3, wherein each accumulator holds up to 32 samples.

5. The vehicle impact detection system of claim 1, wherein to detect the angle of the impact comprises to:
   compute a first vector perpendicular to the forward direction; and
   compute an angle between the first vector and a vector corresponding to a direction of the acceleration.

6. The vehicle impact detection system of claim 1, wherein the acceleration sensor is a micro-electro-mechanical system (MEMS).

7. The vehicle impact detection system of claim 1, wherein to filter the acceleration information comprises to use a configurable moving average filter to attenuate acoustic noise.

8. The vehicle impact detection system of claim 1, wherein the acceleration information is a signal comprising a leading edge, a trailing edge, and an amplitude.

9. The vehicle impact detection system of claim 1, wherein the impact detection application further directs the processor to generate impact data based on the detected angle of the impact and the impact detector signal.

10. The vehicle impact detection system of claim 9, wherein:
   the vehicle impact detection system further comprises a network interface; and
   the impact detection application further directs the processor to transmit the impact data to a remote server system using the network interface.

11. A method for determining an angle of impact of a vehicle, comprising:
   receiving acceleration information using a vehicle impact detection system;
   filtering the acceleration information to attenuate noise using the vehicle impact detection system;
   determining an occurrence of an impact by detecting an acceleration from the acceleration information that exceeds a threshold for a time period using the vehicle impact detection system;
   detecting the angle of the impact with respect to a forward direction using the acceleration information; and
   triggering an impact detector signal using the vehicle impact detection system.

12. The method of claim 11, wherein the threshold value is pre-determined.

13. The method of claim 11, wherein filtering the acceleration information comprises using a series of accumulators positioned in a circular queue.

14. The method of claim 13, wherein each accumulator holds up to 32 samples.

15. The method of claim 11, wherein detecting the angle of the impact comprises:
   computing a first vector perpendicular to the forward direction using the vehicle impact detection system; and
   computing an angle between the first vector and a vector corresponding to a direction of the acceleration using the vehicle impact detection system.

16. The method of claim 11, wherein the using the vehicle impact detection system comprises using an acceleration sensor, a processor, and a memory.

17. The method of claim 11, wherein filtering the acceleration information comprises using a configurable moving average filter to attenuate acoustic noise using the vehicle impact detection system.

18. The method of claim 11, wherein the acceleration information is a signal comprising a leading edge, a trailing edge, and an amplitude.

19. The method of claim 11, further comprising generating impact data based on the detected angle of the impact and the impact detector signal using the vehicle impact detection system.

20. The method of claim 19, further comprising transmitting the impact data to a remote server system using the vehicle impact detection system.

* * * * *